United States Patent
Lewis et al.

(10) Patent No.: US 7,051,580 B1
(45) Date of Patent: May 30, 2006

(54) HYDRAULIC MONITORING METHOD AND APPARATUS

(75) Inventors: Michael Lewis, Santa Rosa, CA (US); Richard Lewis, Santa Rosa, CA (US); Frank Lillo, Santa Rosa, CA (US); Eric Miner, Santa Rosa, CA (US)

(73) Assignee: Western Fiberglass, Inc., Santa Rosa, CA (US)

( * ) Notice: Subject to any disclaimer, the term of this patent is extended or adjusted under 35 U.S.C. 154(b) by 0 days.

(21) Appl. No.: 10/899,574

(22) Filed: Jul. 26, 2004

Related U.S. Application Data

(60) Provisional application No. 60/490,367, filed on Jul. 24, 2003.

(51) Int. Cl.
*G01M 3/04* (2006.01)
(52) U.S. Cl. ..................................... 73/49.5
(58) Field of Classification Search ............ 73/49.5; 285/93
See application file for complete search history.

(56) References Cited

U.S. PATENT DOCUMENTS

| | | | | |
|---|---|---|---|---|
| 3,721,270 A * | 3/1973 | Wittgenstein | ............... | 138/104 |
| 4,805,444 A * | 2/1989 | Webb | ...................... | 73/40.5 R |
| 4,870,856 A * | 10/1989 | Sharp | ...................... | 73/40.5 R |
| 4,932,257 A * | 6/1990 | Webb | ...................... | 73/40.5 R |
| 4,968,179 A * | 11/1990 | Frahm | ......................... | 405/53 |
| 5,297,896 A * | 3/1994 | Webb | .......................... | 405/52 |
| 5,398,976 A * | 3/1995 | Webb | ......................... | 285/93 |
| 5,527,130 A * | 6/1996 | Webb | .......................... | 405/52 |
| 5,589,631 A * | 12/1996 | Spring et al. | ................. | 73/49.2 |
| 5,713,607 A * | 2/1998 | Webb | ....................... | 285/123.1 |
| 5,831,149 A * | 11/1998 | Webb | ..................... | 73/40.5 R |
| 5,911,155 A * | 6/1999 | Webb | ..................... | 73/40.5 R |
| 5,927,762 A * | 7/1999 | Webb | .................... | 285/123.15 |
| 6,029,505 A * | 2/2000 | Webb | ..................... | 73/40.5 R |
| 6,032,699 A * | 3/2000 | Cochran et al. | ............ | 138/104 |
| 6,363,775 B1 * | 4/2002 | Varkovitzky et al. | ........ | 73/49.2 |
| 6,886,388 B1 * | 5/2005 | McGill et al. | ........... | 73/40.5 R |
| 2003/0047212 A1 * | 3/2003 | Bravo et al. | ................. | 137/312 |
| 2004/0234338 A1 * | 11/2004 | Monroe et al. | ............... | 405/54 |

FOREIGN PATENT DOCUMENTS

JP          54108012 A    *  8/1979

\* cited by examiner

*Primary Examiner*—Hezron Williams
*Assistant Examiner*—John Fitzgerald
(74) *Attorney, Agent, or Firm*—Johnson & Stainbrook, LLP; Larry D. Johnson; Craig M. Stainbrook

(57) ABSTRACT

A hydraulic monitoring method and apparatus provides a monitoring system which replaces the void or air space within the interstitial/annular volume of double wall piping with an inert environmentally safe, food grade, hydraulic liquid. Monitoring of the liquid provides rapid, real time sensing of any alarm phase or mode. The method identifies primary piping failures or any secondary containment piping breech or wall penetration with an immediate level change within the fluid sensor monitor reservoirs. If the fluid level decreases, a breech in the secondary containment piping is evidenced. If the fluid level increases, a primary piping wall failure is indicated. This level change can be electronically monitored for rapid system alert and/or system/pump shutdown.

8 Claims, 3 Drawing Sheets

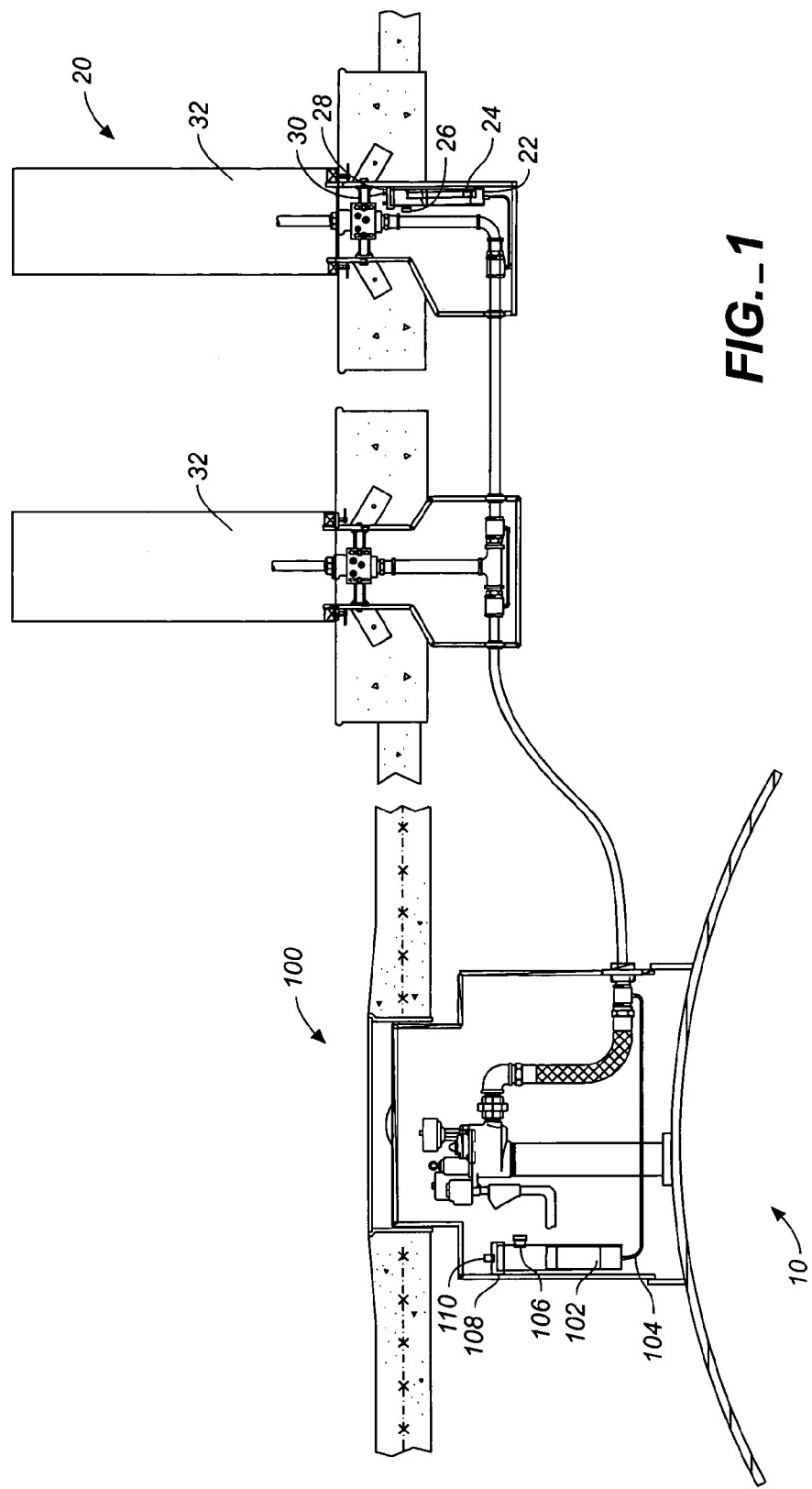
FIG._1

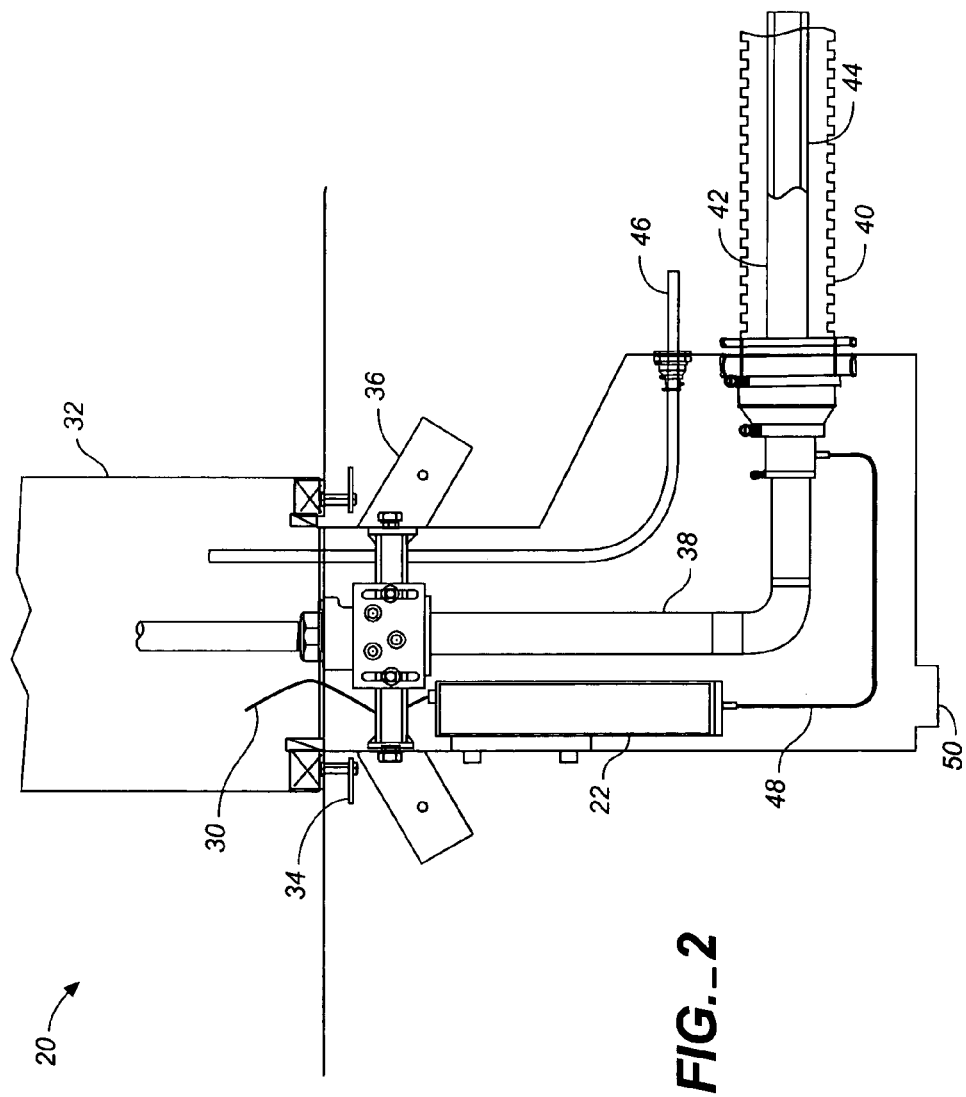
FIG._2

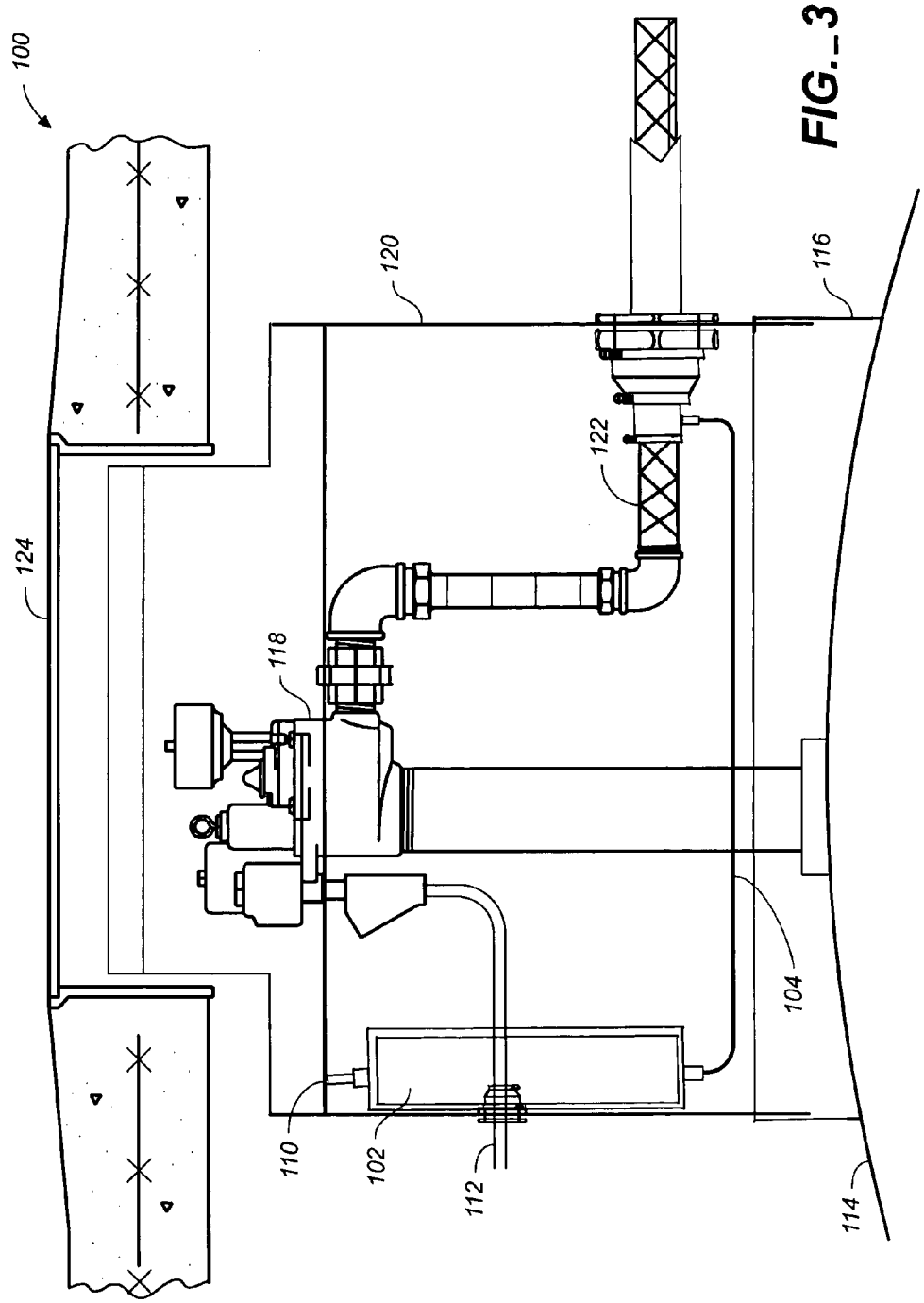
FIG._3

US 7,051,580 B1

HYDRAULIC MONITORING METHOD AND APPARATUS

CROSS REFERENCE TO RELATED APPLICATIONS

The present application claims the benefit of the filing date of U.S. Provisional Patent Application Ser. No. 60/490, 367, filed Jul. 24, 2003.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to pipelines and associated hardware, and more particularly to an improved method and apparatus for monitoring double wall piping such as that used between tanks and dispensers.

BACKGROUND INFORMATION AND DISCUSSION OF RELATED ART

Double wall piping is typically used between tanks and dispensers, and particularly for potentially hazardous materials such as chemicals and petroleum products. Monitors used to detect leakage from this piping typically utilize vacuum or positive pressure testing methods, which can be unreliable, and cannot identify the source of failures.

The foregoing discussion reflects the current state of the art of which the present inventors are aware. Reference to, and discussion of, this information is intended to aid in discharging Applicant's acknowledged duty of candor in disclosing information that may be relevant to the examination of claims to the present invention. However, it is respectfully submitted that no prior art patents or other references disclose, teach, suggest, show, or otherwise render obvious, either singly or when considered in combination, the invention described and claimed herein.

BRIEF SUMMARY OF THE INVENTION

The hydraulic monitoring method and apparatus of this invention provides a monitoring system which replaces the void or air space within the interstitial/annular volume of double wall piping with an inert environmentally safe, food grade, hydraulic liquid. Monitoring of the liquid provides rapid, real time sensing of any alarm phase or mode. Unlike vacuum or positive pressure testing methods which cannot identify the source of failures, the inventive method identifies primary piping failures or any secondary containment piping breech or wall penetration with an immediate level change within the fluid sensor monitor reservoirs. Reservoirs are placed at the high and low points in any given product line or pipe run. If the fluid level decreases, a breech in the secondary containment piping is evidenced. If the fluid level increases, a primary piping wall failure is indicated. Either failure mode, a primary or secondary pipe wall failure, will cause a hydraulic monitor fluid level change. The direction of this fluid change, up or down, positively indicates the leak source(s). This level change can be electronically monitored for rapid system alert and/or system/pump shutdown. System fluid reservoirs preferably have a capacity that exceeds the interstitial/annular space of each monitored pipe run by no less than 25%.

It is therefore an object of the present invention to provide a new and improved monitoring system for product lines and pipe runs.

It is another object of the present invention to provide a new and improved hydraulic monitor for double walled pipe.

A further object or feature of the present invention is a new and improved monitor apparatus for real time sensing of any alarm phase.

An even further object of the present invention is to provide a novel method for monitoring primary or secondary pipe wall failure.

Other novel features which are characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein:

FIG. 1 is a schematic view of a hydraulic monitoring apparatus of this invention;

FIG. 2 is a schematic view of the termination dispenser and upper sensor unit of the hydraulic monitoring apparatus of this invention; and FIG. 3 is a schematic view of the lower or tank pump sump unit of the hydraulic monitoring apparatus of this invention.

DETAILED DESCRIPTION OF THE INVENTION

Referring to FIGS. 1 through 3, wherein like reference numerals refer to like components in the various views, there is illustrated therein a new and improved hydraulic monitoring apparatus, generally denominated 10 herein. FIG. 1 is a schematic view of the hydraulic monitoring apparatus, FIG. 2 is a schematic view of the termination dispenser and upper sensor unit of the system, and FIG. 3 is a schematic view of the lower or tank pump sump unit of the system.

FIG. 1 is a schematic view of the hydraulic monitoring apparatus 10 of this invention. Apparatus 10 includes termination dispenser and upper sensor unit 20, with monitor reservoir 22, monitor/sensor 24, fluid level sight tube 26, cable entry cap 28, and monitor/sensor wire 30. Lower or tank pump sump unit 100 of the system includes reservoir 102, secondary/interstitial access tube 104, fluid level sight tube 106, monitor cap 108, and fill valve 110.

FIG. 2 is a schematic view of the termination dispenser and upper sensor unit 20 of the hydraulic monitoring apparatus 10. Components include reservoir tank 22, sensor wires 30, dispenser 32, dispenser anchor 34, stabilizer bar 36, vertical connector 38, pipe conduit 40, containment pipe 42, product pipe 44, electrical conduit 46, pipe monitor tube 48, and sensor cup 50.

FIG. 3 is a schematic view of the lower or tank pump sump unit 100 of the hydraulic monitoring apparatus 10. Components include reservoir 102, monitor tube 104, fill valve 110, electrical conduit 112, tank 114, tank collar 116, turbine 118, turbine containment sump 120, product line 122, and manway 124.

The inventive hydraulic monitoring system includes two fluid monitor reservoirs and the interstice connection tubes. These include the lower or tank pump sump unit and the termination dispenser/upper sensor unit. Each fluid reservoir preferably incorporates a sight tube view port located for ease of fluid level inspection and a piping connection port. Upper, dispenser point sensor reservoirs preferably include a removable cable entry and a pressure overflow relief valve cap. Lower, tank sump, reservoirs preferably include a fluid fill/shut off valve assembly and lower monitor connection port. Inter-connection tubes with termination fittings are included. Each dual reservoir monitoring system preferably includes a five gallon fill container including food grade hydraulic fill fluid, hand pump and fittings with connection hose(s). One hydraulic monitoring system includes the two reservoirs and crossover/test tubes with connections as described above for each fuel product pipe line.

Installation of the inventive apparatus may include, but not be limited to, the following steps:

Component Installation: 1) Un-pack system components and inspect for any damaged or missing parts. 2) Install reservoir tank mounting brackets to tank sump or dispenser containment sump wall with hardware provided if required. Be certain any sump wall penetrations made are sealed and tested prior to operation. After bracket installation is complete, mount reservoirs to brackets. Reservoirs should be mounted vertically with ease of access to connection fittings and sight port(s). 3) Connect piping system interstitial/annular crossover/test tubes to monitor reservoir fitting ports located in reservoir bottom flange.

System Filling: 1) Inspect all fittings and connections prior to system filling. 2) Connect pump transfer hose to lower, tank sump, reservoir valve (on reservoir top) and to fluid transfer storage container pump. 3) Open upper, dispenser point reservoir cap. 4) Pump monitor fluid slowly into system. Note level increase in upper, dispenser unit. As you fill, the interstitial space of the pipe run fills into the upper reservoir. Continue to slowly fill system until half of upper dispenser reservoir tank is full. Shut off lower reservoir fill valve and remove fluid pump hose. 5) Install any electronic monitoring sensors as required into upper, dispenser reservoir, calibrate as required and replace cap. Follow electronic sensor manufacturer's instructions completely. System is ready for operation.

Service and Maintenance: Periodic inspection of monitor fluid reservoir levels and connection tightness should be performed at least once a year. If necessary, re-connect monitor fluid storage container and pump/hose assembly to lower, tank sump reservoir and re-fill as required. Do not substitute other fluids.

Construction specifications include, but are not limited to, the following: the system is constructed with smooth wall, reserve capacity reservoirs that are specialized chemical and permeation resistant. The fittings are fuel and corrosion resistant. The connection hose is a smooth, seamless sheath of fuel resistant material. The system is constructed of materials that are not harmful to the environment. The system is suitable for chemicals, food products, petroleum products and blends including methanol, ethyl alcohol, MTBE, ETBE and additives.

Thus, the inventive hydraulic coaxial monitor system is installed for the purpose of monitoring piping interstitial/secondary capacity and provide detection of failures (breeches) in primary or secondary containment. The hydraulic coaxial monitoring system contains no environmentally hazardous fluids that might leak from the product or secondary piping. The system provides fluid communication, accommodates electronic monitoring systems and includes corrosion resistant fittings and couplings for connections within containment sumps located at the tanks and dispensing points.

The inventive hydraulic monitoring system provides secure, secondarily contained monitoring between storage and dispensing devices piping with equal and constant monitoring for both primary and secondary pipe sections. The system can be installed within dispensing and tank top containment sumps. The system can monitor any release of environmental contaminates from the product primary pipe, contained within the monitoring system. The system provides fittings, test points and connections as required to facilitate direct connection monitoring of primary and containment piping between product storage and dispensing points.

Accordingly, the invention may be characterized as a hydraulic monitor apparatus for double wall piping having primary pipe, a secondary containment pipe, and an interstitial volume, the hydraulic monitor apparatus comprising: an upper sensor unit having an upper monitor fluid reservoir hydraulically connected to the double wall piping interstitial volume; a monitor fluid level sensor connected to the upper monitor fluid reservoir; and a lower sump unit having a lower monitor fluid reservoir hydraulically connected to the double wall piping interstitial volume; wherein a monitor fluid level decrease indicates a breech in the secondary containment pipe, and a monitor fluid level increase indicates a primary pipe wall failure.

Alternatively, the invention may be characterized as a method for monitoring breeches in double wall piping, the method comprising the steps of: filling the interstitial/annular volume of the double wall piping with an inert hydraulic liquid; and monitoring the inert liquid level to provide real time sensing of piping failure.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed is:

1. A hydraulic monitor apparatus for double wall piping having primary pipe, a secondary containment pipe, and an interstitial volume, said hydraulic monitor apparatus comprising:

an upper sensor unit having an upper monitor fluid reservoir hydraulically connected to the double wall piping interstitial volume;

a monitor fluid level sensor connected to said upper monitor fluid reservoir; and a lower sump unit having a lower monitor fluid reservoir hydraulically connected to the double wall piping interstitial volume; wherein a monitor fluid level decrease indicates a breech in the secondary containment pipe, and a monitor fluid level increase indicates a primary pipe wall failure.

2. The hydraulic monitor apparatus of claim 1 wherein said interstitial volume is filled with an inert environmentally safe, food grade, hydraulic liquid.

3. The hydraulic monitor apparatus of claim 1 wherein said upper monitor fluid reservoir includes a fluid level sight tube.

4. The hydraulic monitor apparatus of claim 1 wherein said lower monitor fluid reservoir includes a fluid level sight tube.

5. The hydraulic monitor apparatus of claim 1 wherein said lower monitor fluid reservoir includes a fill valve.

6. The hydraulic monitor apparatus of claim 1 wherein said upper monitor fluid reservoir includes a pressure overflow relief valve.

7. A method for monitoring breeches in double wall piping, said method comprising the steps of:

filling the interstitial/annular volume of the double wall piping with an inert hydraulic liquid by placing reservoirs at the high and low points in the pipe run; and monitoring the inert liquid level to provide real time sensing of piping failure.

8. A method for monitoring breeches in double wall piping, said method comprising the steps of:

filling the interstitial/annular volume of the double wall piping with an inert hydraulic liquid by placing reservoirs with a capacity that exceeds the interstitial/annular space of the monitored pipe run at the high and low points in the pipe run; and monitoring the inert liquid level to provide real time sensing of piping failure.

* * * * *